United States Patent Office 3,649,562
Patented Mar. 14, 1972

3,649,562
CATALYST FOR THE OXIDATION AND
AMMOXIDATION OF OLEFINS
Robert E. Lane, Lake Jackson, Tex., assignor to The Dow
Chemical Company, Midland, Mich.
No Drawing. Filed May 26, 1969, Ser. No. 827,956
Int. Cl. B01j *11/74*
U.S. Cl. 252—439        2 Claims

ABSTRACT OF THE DISCLOSURE

A catalyst for preparing aldehydes and nitriles by reacting an olefin, or an unsaturated alcohol or ether, and $O_2$, or $O_2$ and $NH_3$. The catalyst consists essentially of the mixed oxides of Fe, Mo, Te and at least one of Re, Mn and V.

BACKGROUND OF THE INVENTION

The reaction of an olefin with $O_2$ in the presence of a catalyst for producing unsaturated aldehydes is well known. Also well known is the reaction of olefins with $O_2$ and $NH_3$ to produce the corresponding unsaturated nitrile. These reactions have been classically carried out in the presence of various catalyst systems, including $Cu_2O$, Group IV(b) metals plus V and Mn, platinum group metals with Group V(a) promoters, phosphorous-containing catalysts, and, most recently, Te promoted catalyst systems.

U.S. Pat. 3,331,871, teaches a catalyst, $$Mo_{800}Ni_{160-800}TeO_{25-375}Re_{1-6}$$

for the oxidation of olefins. However, it is therein reported that butenes are converted to carbon oxides.

U.S. Pat. 3,401,197 reports a catalyst, $Mo_{20}Te_{1-10}$ Group VIII metal $_{2-20}P_{2-20}O_{39-120}$, for the oxidation of olefins.

SUMMARY OF THE INVENTION

The instant invention comprises processes and a new catalyst system for the oxidation or ammoxidation of olefins or unsaturated alcohols or ethers. The new catalyst system consists essentially of the mixed oxides of Fe, Mo, Te and at least one of Re, Mn and V.

The preferred catalyst system has the following desired atomic composition:

$$Fe_xMo_yTe_zM$$

wherein $x$ is 0.5 to 1000, $y$ is 5 to 1500, $z$ is 0.1 to 200 and M is at least one of Re, Mn and V.

A more preferred catalyst is $Fe_{x'}Mo_{y'}Te_{z'}Re$, wherein $x'$ is 50 to 700, $y'$ is 500 to 1300 and $z'$ is 20 to 80. This combination of metal oxides has been found to be superior to other combinations; however, Mn and/or V may be substituted for, or combined with, Re.

The oxidation and ammoxidation reactions of olefins and their equivalents are well known in the art. Operating conditions for the new catalysts are essentially the same as for known metal oxide catalysts. Suitably, the reactants should be contacted at a temperature of about 200° to 500° C., and preferably 300° to 400° C., for a contact time of 0.1 to 50 seconds, and preferably 1 to 15 seconds; and at a pressure of 0.5 to 15 atmospheres, and preferably 14–16 p.s.i.a. or at pressure conditions which will keep the desired products in the vapor phase. An inert diluent may be utilized, such as nitrogen, steam, $CO_2$, saturated hydrocarbons or excess olefin.

A mole ratio of $O_2$/olefin of 15/1 to 0.1/1 is suitable while 0.5/1 to 6/1 is preferred. A mole ratio of diluent/$O_2$ of 0/1 to 50/1 is also suitable, while 15–65 volume percent of total feed is preferred. In the ammoxidation reaction, a mole ratio of $NH_3$/olefin of from 0.5 to 10 is acceptable, while as little as possible to effect complete conversion of aldehyde to nitrile is preferred.

$O_2$ and $O_2$-containing gases, such as air, are suitable for the oxidizing agent. $NH_3$ and lower primary alkyl amines and alkylene diamines, such as methylamine, n-butylamine and ethylenediamine, are suitable for the ammoxidation reaction. The products obtained using these primary amines, however, is a Schiff base rather than a nitrile.

Lower olefins such as propene, isobutene, 1-butene and 2-butene are suitable for oxidation and ammoxidation by the process and catalyst of this invention.

Similarly, lower aliphatic and cyclic unsaturated alcohols and ethers are suitable. Examples include (meth)allyl alcohol, (meth)allyl ether, dihydrofuran and crotyl alcohol.

Products which can be prepared from olefins include (meth)acrolein, acetaldehyde, propionaldehyde, isobutyraldehyde, maleic acid, (meth)acrylonitrile, acetonitrile and isobutyronitrile. Also produced are small amounts of saturated and unsaturated acids, such as (meth)acrylic acid and acetic acid. The C—O bond of the alcohols and ethers are converted to aldehyde or ketone groups. Thus, allyl ether yields 2 moles of acrolein or acrylonitrile.

Among the catalysts which are suitable for the process of this invention are the following:

$$Mo_{500}Fe_{50}Te_{20}Mn_{0.5}V_{0.5}$$

$$Mo_{1000}Fe_{600}Te_{75}Re_1$$

$$Mo_{500}Fe_{500}Te_{50}Re_{0.5}V_{0.5}$$

$$Mo_{750}Fe_{200}Te_{80}V_1$$

$$Mo_{1300}Fe_{700}Te_{80}Re_{0.5}Mn_{0.5}$$

$$Mo_{100}Fe_{50}Te_{20}Mn_1$$

$$Mo_{600}Fe_{300}Te_{40}Re_{0.3}Mn_{0.4}V_{0.3}$$

The catalysts of this invention are prepared by combining the metal salts or oxides in water in a flask with stirring. If neutralization is desired (may be necessary when metal supports are used) ammonia solution is added until the neutral point is reached. The product is transferred to a tray where stirring and warming in air dehydrates the slurry. A support may be added during the dehydration. The product is then broken up for use, or powdered and pelleted. Molybdenum is usually added as ammonium-p-molybdate, but $MoO_3$ or other Mo compounds are acceptable. Similarly, ammonium-m-vanadate or other vanadium compounds, e.g. $V_2O_5$, may be used. Iron and manganese may be added as nitrates, oxides or other salts; tellurium is usually added in the form of the oxide, $TeO_2$. Tellurium metal or a metal tellurate may be dissolved in an acid, e.g. HCl, before use. Rhenium may be added as perrhenic acid or as a salt of the metal.

Supports may be Carborundum, firebrick, silica, alumina, Alundum or similar commercial supports known to the art. The preferred supports are metal particles of good heat capacity and heat transfer properties such as aluminum granules, copper, silver or lead shot or iron particles. Surface area of the catalyst is preferably 5 to 50 sq. meters/gram.

SPECIFIC EMBODIMENTS

Example 1.—Preparation of catalyst (a) Distilled water (300 ml.) was placed in a 2 liter, 4-necked round bottom borosilicate flask equipped with a condenser, stirrer, thermometer, pressure equalizing addition funnel and heating mantle. Ammonium heptamolybdate·$4H_2O$ (176.6 g.) was added to the water and the stirring mixture was warmed to 50° C. Ferric nitrate·$9H_2O$ (242.3 g.) was dissolved in 250 ml. $H_2O$ and the solution was added dropwise to the flask. Perrhenic acid (0.25 g.) was dissolved in 10 ml. of water and was poured into the flask. Tellurium dioxide (11.96 g.) was added slowly to stirred concentrated HCl solution (105 ml.); when dissolved, the solution was added cautiously dropwise to the flask. Stirring was continued and ammonia solution was added until a test of the flask contents with test paper showed the product to be approximately neutral (pH 6–8). The product was poured into a glass tray which was heated on a steam cone under an infrared lamp with constant stirring until the product solidified. Then the tray was calcined at 550° C. for 5 hours. The solid remaining was a light green lumpy material, weighing 200 grams. It was broken with an ice pick into pieces and powdered and pelleted to give good pellets of low fines content.

(b) One run similar to 1(a) was made wherein half the catalyst prior to dehydration was added to 48 grams of aluminum granules (6–10 mesh) and dehydration was continued until the granules remained suspended in the slurry. This product was calcined and broken up with an ice pick.

(c) A similar catalyst to that of 1(a) was made except that $Fe(NO_3)_3$ was replaced with 162.2 g. of $FeCl_3 \cdot 6H_2O$, giving the same atomic ratio of Fe.

Example 2.—Oxidation and ammoxidation reactions

The reactors were ½-inch or ⅜-inch stainless steel tubes 78 inches long, arranged vertically, with Nichrome wire spiral catalyst supports at the bottom. Flow was downward.

The reactor tubes were housed in a shell (6 inch I.D. by 4 ft.) which contained 2 gallons of polyphenyl ether (bathing 48 inches of the reactor). The bath was heated by 4 immersion heaters and 4 wall heaters. The unit was well insulated. Thermocouples were placed every 6 inches vertically and a thermoswitch (2 feet from the reactor's bottom) was present to prevent runaway heating in case of vacuum loss. A take off from the top of a reflux condenser (connected to the top of the shell side of the reactors) was attached to a vacuum pump. Full vacuum produced about 7 mm. Hg pressure in the reactor's shell.

The reactor's temperature varied between about 350° and 370° C. (depending upon the vacuum setting) where contacting the liquid and about 335° to 360° C. where contacting the vapor. The reported reaction temperature was the measured temperature of the boiling fluid, since the catalyst volume was adjusted to give a level below the top of the liquid in the reactor's shell. The vapor area above acted as a preheater zone.

Contact time was calculated by utilizing the volume of the reaction zone (the volume of 48 linear inches of reactor without correcting for the catalyst volume) with calculated gas volumes under reaction conditions, assuming the gas laws hold true.

The feed gases were passed through rotameters (calibrated with bubble counter and stopwatch) and mixed in a ¼-inch I.D. pipe cross leading to the reactor. The amount of catalyst, as prepared in Example 1, placed on the Nichrome support at the bottom of the reactors is given in Table I, the length of the catalyst bed being 48 inches.

Two cold traps in ice-water and Dry Ice-acetone-filled flasks were prepared and when the olefin flow was equalized the traps were attached in series in the effluent line to trap the products as condensate. The samples of feed, vent gases and the liquids collected were analyzed by gas chromatography.

Table I gives the recipes and conditions for various runs. Table II, in the same order as Table I, gives the conversion of olefin and yield of product based on converted olefin.

The unspecified portion of the feed gas was $N_2$, except in Run #19, where it was steam.

TABLE I

| Run No. | Temp., ° C. | Contact time (sec.) | Feed composition, volume percent | | | Catalyst used, Example No. |
|---|---|---|---|---|---|---|
| | | | Olefin | Air | $NH_3$ | |
| 1 | 360 | 15 | i-$C_4H_8$/1.72 | 58.9 | 9.76 | 1(b) |
| 2 | 360 | 15 | $C_3H_6$/2.0 | 55.2 | 4.65 | 1(b) |
| 3 | 360 | 8 | i-$C_4N_8$/2.15 | 58.35 | | 1(c) |
| 4 | 360 | 6 | i-$C_4H_8$/1.60 | 58.35 | | 1(c) |
| 5 | 360 | 3 | i-$C_4H_8$/1.65 | 58.9 | | 1(b) |
| 6 | 360 | 1 | i-$C_4H_8$/1.73 | 58.9 | | 1(b) |
| 7 | 360 | 2 | i-$C_4H_8$/1.87 | 58.9 | | 1(b) |
| 8 | 360 | 6 | i-$C_4H_8$/1.65 | 58.35 | | 1(c) |
| 9 | 342 | 8 | i-$C_4H_8$/2.8 | 58.30 | | 1(a) |
| 10 | 355 | 6 | $C_3H_6$/2.11 | 58.4 | | 1(a) |
| 11 | 355 | 6 | $C_3H_6$/2.0 | 58.4 | | 1(a) |
| 12 | 355 | 8 | $C_3H_6$/2.7 | 58.4 | | 1(a) |
| 13 | 355 | 10 | $C_3H_6$/2.39 | 58.4 | | 1(a) |
| 14 | 355 | 15 | $C_3H_6$/1.9 | 58.4 | | 1(a) |
| 15 | 355 | 15 | $C_3H_6$/2.92 | 58.4 | | 1(a) |
| 16 | 355 | 15 | $C_3H_6$/1.51 | 58.4 | | 1(a) |
| 17 | 355 | 15 | $C_3H_6$/2.37 | 58.4 | | 1(a) |
| 18 | 355 | 9 | $C_3H_6$/1.79 | 58.9 | | 1(a) |
| 19 | 386 | 6 | $C_3H_6$/16.28 | 20.0 | | 1(a) |

TABLE II

| Run No. | Percent olefin conversion | Mole percent of total product | | | | |
|---|---|---|---|---|---|---|
| | | $CO_2$ | Acrylonitrile | Methacrylonitrile | Acrolein | Methacrolein |
| 1 | 69.3 | 19.7 | 8.5 | 68.0 | | 3.9. |
| 2 | 51.6 | 11.4 | 87.6 | None | 0.99 | None. |
| 3 | 97.5 | 22.4 | None | do | 4.1 | 73.5. |
| 4 | 77.0 | 24.6 | do | do | 0.17 | 75.0. |
| 5 | 100 | 27.4 | do | do | 0.9 | 71.8. |
| 6 | 99.8 | 24.5 | do | do | 2.3 | 73.2. |
| 7 | 93.3 | 26.0 | do | do | 1.5 | 73.8. |
| 8 | 91.0 | 27.4 | do | do | 10.0 | 62.6. |
| 9 | 67.6 | 41.8 | do | do | 0.34 | 54.0. |
| 10 | 38.9 | 4.0 | do | do | 95.9 | None. |
| 11 | 38.7 | 3.7 | do | do | 96.2 | Do. |
| 12 | 40.5 | 3.25 | do | do | 96.7 | Do. |
| 13 | 40.8 | 1.67 | do | do | 98.3 | Do. |
| 14 | 56.6 | 3.5 | do | do | 96.4 | Do. |
| 15 | 65.4 | 3.3 | do | do | 96.6 | Do. |
| 16 | 57.0 | 3.3 | do | do | 96.6 | Do. |
| 17 | 63.2 | 3.1 | do | do | 96.8 | Do. |
| 18 | 34.7 | 15.0 | do | do | 84.4 | Do. |
| 19 | 68.5 | 5.4 | do | do | 94.6 | Do. |

Example 3

Allyl ether containing a trace of hexadiene (0.17 volume percent in Run 1, and 0.22 volume percent in Run 2) was placed in a glass flask. Nitrogen was sparged into the flask at 5 cc./min. and the ether laden vapor (59 volume percent air) was passed into a stream of 60.3 cc./min. air and 34.6 cc./min. nitrogen. The mixed gases were passed into a ⅜" dia. reactor tube of the reactor above, containing 15 cc. of MoFeTeRe catalyst (Number 1A above) at 357° C., 4 seconds contact time, in both cases. The product gases were held at 160° C. in an oven until sampled for analysis on the chromatographic columns. Feed gas was diverted to this same chromatographic unit for analysis.

Both runs resulted in 100% conversion, Run 1 producing 20 mole percent $CO_2$ and 80 mole percent acrolein, Run 2 producing 17 mole percent $CO_2$ and 83 mole percent acrolein.

I claim:

1. A catalyst composition for preparing aldehydes and nitrides consisting essentially of the mixed oxides of Fe, Mo, Te and an oxide of at least one metal selected from the group consisting of Re, Mn and V, wherein the mixed oxides are present in the catalyst in proportions such that the atomic ratio of the metals is $Fe_xMo_yTe_zM$, wherein $x$ is 0.5 to 1000, $y$ is 5 to 1500, $z$ is 0.1 to 200 and M is at least one metal selected from the group consisting of Re, Mn and V.

2. The catalyst composition of claim 1 wherein $x$ is 50 to 700, $y$ is 500 to 1300 and $z$ is 20 to 80.

References Cited

UNITED STATES PATENTS

| | | | |
|---|---|---|---|
| 3,236,782 | 2/1966 | Koch | 252—411 |
| 3,326,961 | 6/1967 | Eden et al. | 252—439 X |
| 3,423,331 | 1/1969 | Eden | 252—439 X |
| 3,451,946 | 6/1969 | Ziegler et al. | 252—439 |
| 3,475,348 | 10/1969 | Ziegler et al. | 252—439 |
| 3,492,247 | 1/1970 | Eden | 252—437 |

PATRICK P. GARVIN, Primary Examiner

U.S. Cl. X.R.

260—465.3, 465.9, 601, 603, 604, 566